Sept. 11, 1934.　　　　N. TRBOJEVICH　　　　1,973,185
GEAR AND GEAR TOOTH
Filed Aug. 14, 1931　　　4 Sheets-Sheet 1

INVENTOR
Nikola Trbojevich
BY Whittemore Hulbert
Whittemore & Belknap
ATTORNEYS

Sept. 11, 1934.  N. TRBOJEVICH  1,973,185
GEAR AND GEAR TOOTH
Filed Aug. 14, 1931  4 Sheets-Sheet 3

INVENTOR
Nikola Trbojevich
BY Whittemore Hulbert
Whittemore & Belknap
ATTORNEYS

Sept. 11, 1934.　　N. TRBOJEVICH　　1,973,185
GEAR AND GEAR TOOTH
Filed Aug. 14, 1931　　4 Sheets-Sheet 4
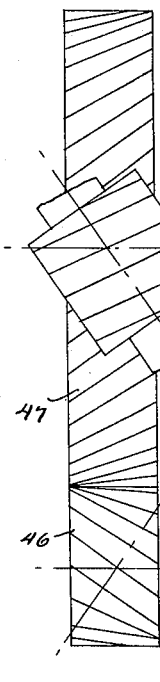
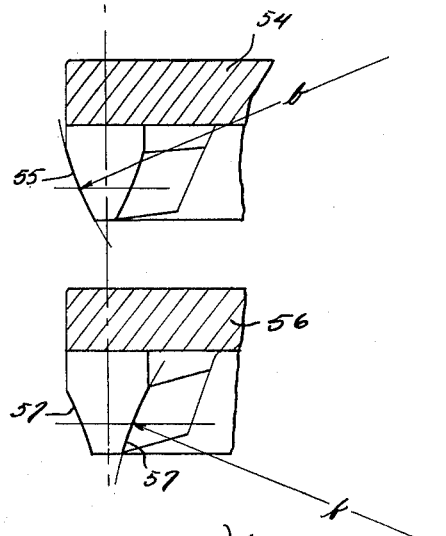
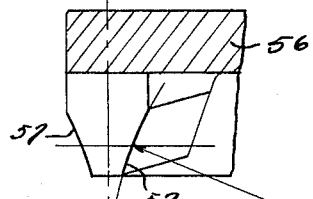
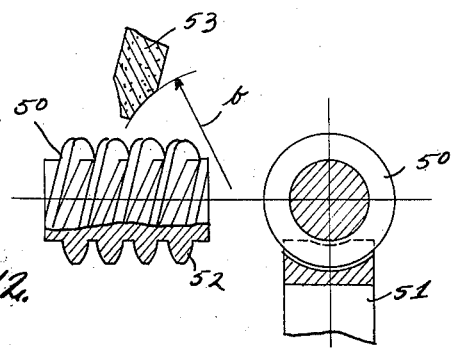
INVENTOR
Nikola Trbojevich
BY Whittemore Hulbert
Whittemore & Belknap
ATTORNEYS Patented Sept. 11, 1934

1,973,185

UNITED STATES PATENT OFFICE 1,973,185

GEAR AND GEAR TOOTH

Nikola Trbojevich, Detroit, Mich.

Application August 14, 1931, Serial No. 557,187

8 Claims. (Cl. 74—41)

The invention relates to a novel system of tooth curves and is applicable to spur, helical, bevel and worm gears and racks.

The object of my invention is so to form the tooth curves that the relative radii of curvature in the mating faces will be considerably increased and the Hertz stresses thereby reduced.

Heretofore it was customary to generate a mating pinion and gear from the same basic rack with the result that the pinion flanks were sharply curved and, therefore, highly stressed under load. I conceived the idea of generating the pinion from a rack P the flanks of which are convex and the (larger) mating gear from a rack G having concave faces. By a proper selection of the rack flank curvature I am now enabled to construct a pinion and gear in which the radii of curvature in the pinion are increased at the expense of the gear radii. The principle is of a particular value for high ratios of transmission, i. e., in which the diameters of the mating gears greatly differ.

The objects of this invention are to produce quieter gears to increase the permissible loading, and to equalize the surface stresses and the depth-wise deformations in various phases of engagement.

In the drawings:

Figure 11 illustrates the method of hobbing two mating helical gears on this principle;

Figures 12 and 13 diagrammatically show an improved worm and worm gear of this kind; and Figures 14 and 15 show two cutters of the face mill type to generate spiral bevel pinions and gears respectively according to this principle.

In the following discussion I shall use the term "curvature" in its strictly numerical sense meaning the reciprocal of the "radius of curvature". In two mating curves, the "relative curvature" will be the sum of the particular curvatures, the convex faces being considered as of a positive and the concave faces as of a negative curvature.

In the theory of gearing I think I am the first to discover the following rule: "For given center distance, ratio and pressure angle the relative curvature of two mating curves is constant at the pitch point, regardless of the curvature of the generating rack."

Figure 1:
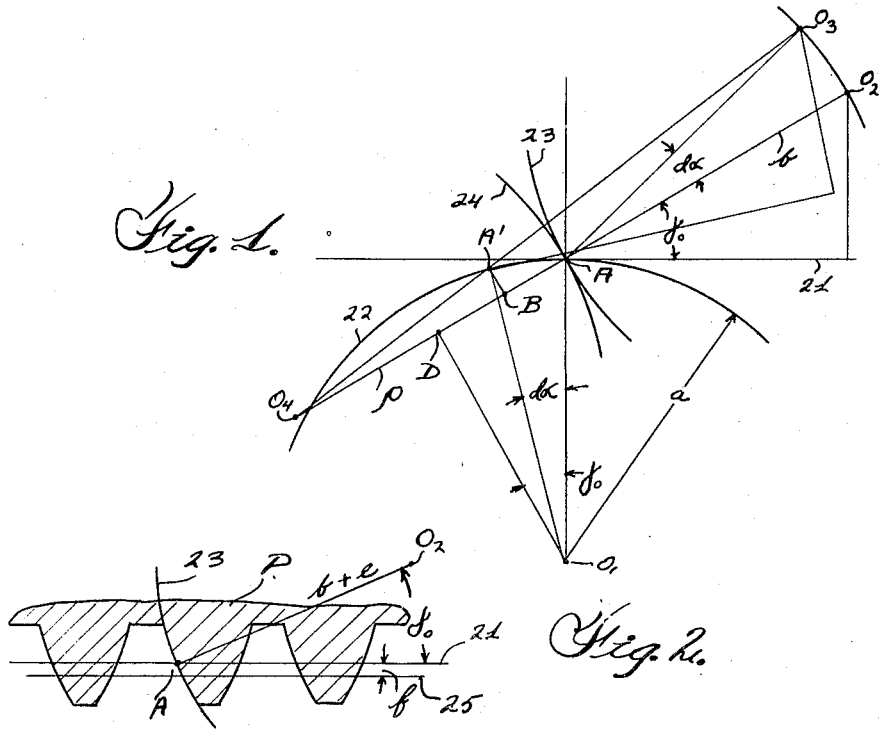
Figure 1 is a diagram showing the effect of the rack curvature upon the generated curve.

The proof of this theorem will be seen from Figure 1. Let the pitch line 21 of the (convex) rack 23 roll over the pitch circle 22 of the gear. Upon an infinitesimal roll from A to A' the center of curvature $O_2$ of the rack will travel to $O_3$. The center of curvature of the mating curve 24 will be at the point $O_4$, said point being the intersection of the two consecutive normals $O_2$ A and $O_3$ A' of the path curve $O_2$ $O_3$. The arc A' B struck from $O_4$ is, hence, parallel to the arc $O_2$ $O_3$. Neglecting the differentials of the higher order than the first I have, $$A'B = ad\alpha \sin \gamma_0 \quad (1)$$
$$O_2 O_3 = bd\alpha \quad (2)$$

but, $$\frac{A'B}{O_3 O_2} = \frac{\rho}{\rho + b} \quad (3)$$

$$\frac{ad\alpha \sin \gamma_0}{bd\alpha} = \frac{\rho}{\rho + b} \quad (4)$$

$$\frac{1}{\rho} + \frac{1}{b} = \frac{1}{a \sin \gamma_0} = \text{const. Q. E. D.} \quad (5)$$

where $b$ is the radius of curvature of the rack 23 and $\rho$ the radius of the generated curve 24.

Equation 5 shows that the relative curvature existing between the tooth curve 24 and the rack 23 at the pitch point A is a constant depending upon the pressure angle $\gamma_0$. The curvature of the rack curve, in this case, is $$+\frac{1}{b}$$

and to generate a curve capable of meshing with the curve 24, I must use another rack having a negative curvature equal to $$-\frac{1}{b}.$$

Let now the quantities pertaining to two mating gears be denoted with indices 1 and 2, it stands that $$\frac{1}{\rho_1} + \frac{1}{b} = \frac{1}{a_1 \sin \gamma_0} \quad (6)$$

$$\frac{1}{\rho_2} - \frac{1}{b} = \frac{1}{a_2 \sin \gamma_0} \quad (7)$$

$$\frac{1}{\rho_1} + \frac{1}{\rho_2} = \frac{1}{a_1 \sin \gamma_0} + \frac{1}{a_2 \sin \gamma_0} = \text{const.} \quad (8)$$

in which always $$\rho_1 > a_1 \sin \gamma_0 \quad (9)$$
$$\rho_2 < a_2 \sin \gamma_0 \quad (10)$$

or, in other words, it is possible to increase the radius of curvature of one tooth curve at the expense of the mating tooth curve by employing two racks, one convex and one concave, in generation.

Therefore, my system of generating possesses a flexibility which the now known and employed systems do not have. To illustrate with an example, let the ratio be six to one. In ordinary gearing, the radius of the pinion flank would be, then, one sixth of the gear flank radius. In my system, however, I may increase the pinion radius at will, for instance, I can make both radii equal.

Figure 2:
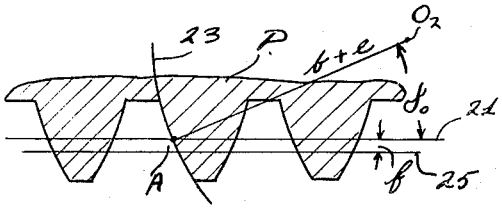
Figures 2 and 3 show the two new basic racks P and G, complementary to each other.
Figure 3:
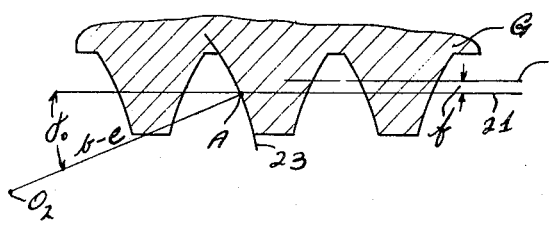

In Figures 2 and 3 the two new racks P and G are shown, the first having convex and the second concave flanks 23. In order to simplify the manufacture of the cutting tools such as hobs, fellows cutters and grinders, I select the curve 23 to be a true circle. This limitation is not theoretically necessary, however. I also select the radius of the P rack to be slightly greater and the radius of the G rack slightly less than $b$ in order to ease off the contact at the tips and roots of the teeth.

It is to be noted that the racks P and G are complementary of each other, as a mechanic would say, one is male and the other female. Two gears will mesh together if one is cut with the P and the other with the G rack or hob. But two P or two G gears will not run together.

Long addendum gears may also be generated in this system similar to the conventional system. Suppose that in the P rack the pitch line 21 is lowered through a distance $f$ in the new position 25, then the pitch line of the G rack must be raised the corresponding amount. Inasmuch as the two racks are fully complementary of each other, no extra back lash will develop during such a procedure.

Figure 4:
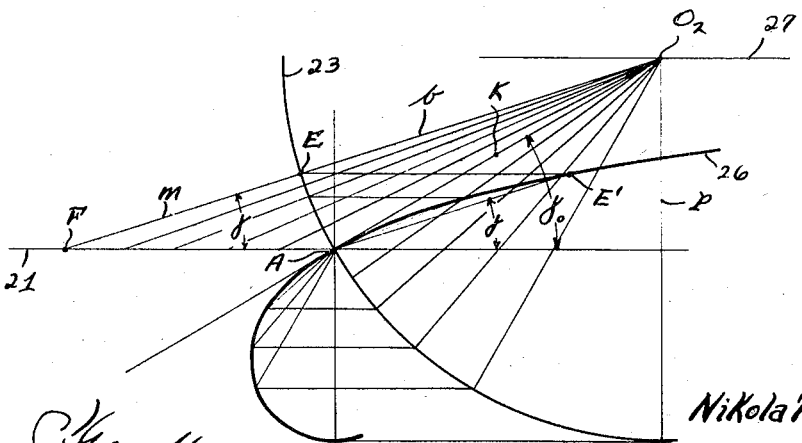
Figure 4 shows the new line of action employed in this gearing.

The line of action 26 of either the racks P or G is plotted in Figure 4. A series of normals such as $O_2$ E F are drawn to the rack curve 23 and the intercepts with the pitch line 21, such as F E are scaled off from the pitch point A by constructing a series of parallelograms, such as A F E E'. The locus of the points E' gives the new line of action 26. This curve happens to be an already known curve, the so-called "conchoid of Nicomedes" whenever the rack curve 23 is a circle. Its polar equation referred to the pitch line 21 as the axis and the point A as the origin is readily found, viz., $$p = (b+m) \sin \gamma \quad (11)$$

$$m = \frac{p}{\sin \gamma} - b \quad (12)$$

where $m$ is the vector and $\gamma$ the variable angle. A particular advantage of this line of action is in its behavior above the pitch line of the pinion. As is seen in Figure 4 the duration of contact A E' is considerably longer than the corresponding common involute length of contact A K for the same pressure angle and depth of tooth. For this reason, the new pinions possess a better overlapping action and may be constructed to have fewer teeth than was feasible to use heretofore.

Figures 5, 6:
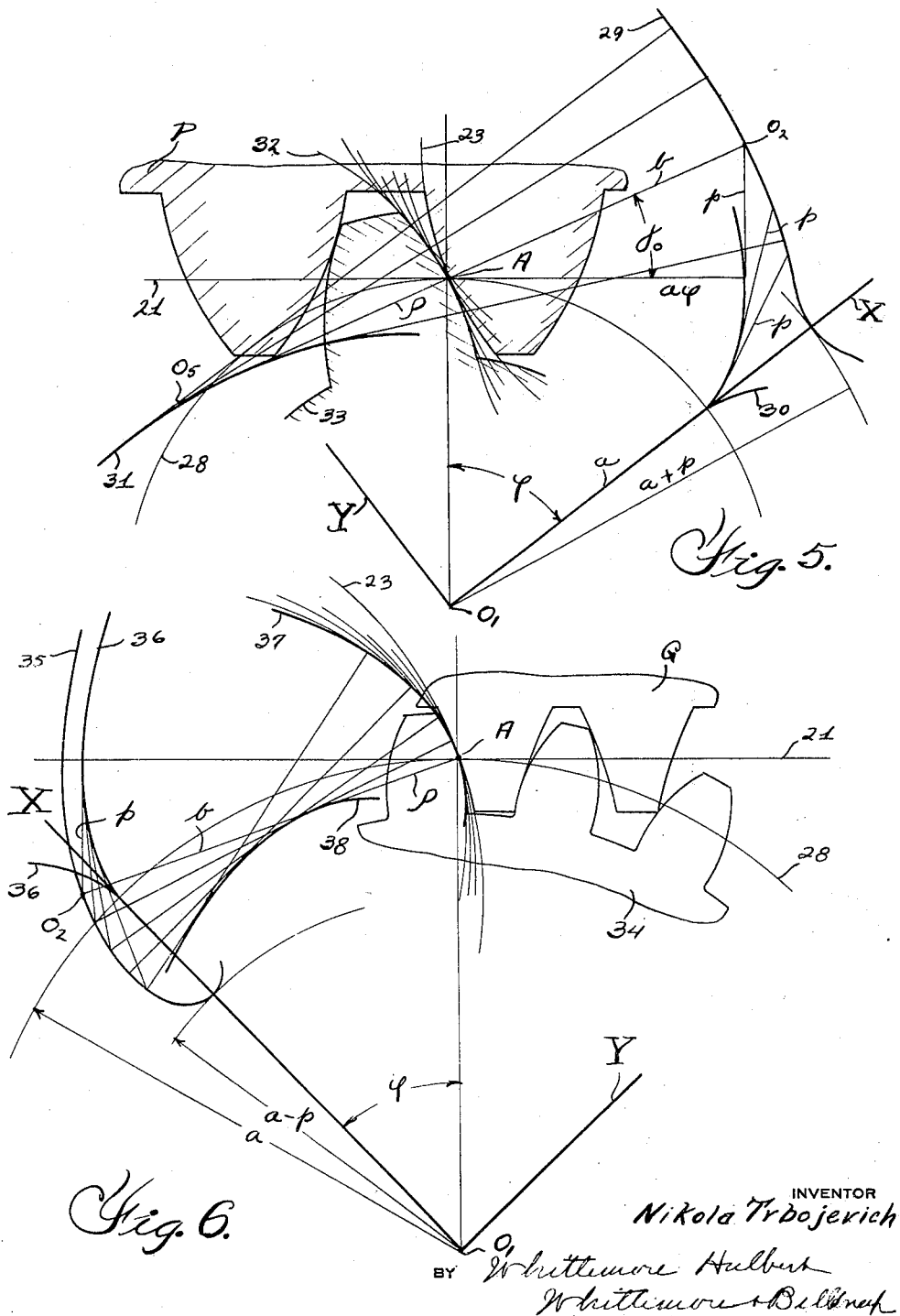
Figure 5 shows a rack P in engagement with my improved pinion.
Figure 6 shows a rack G in engagement with my improved gear.

The construction of the improved pinion tooth curve 32 is shown in Figure 5. A P rack having convex circular faces 23 is rolled over the pinion 33 in such a manner that the corresponding pitch lines 21 and 28 do not slip one over the other. Relative to the fixed center $O_1$ and the pinion 33 the center $O_2$ of the rack curve 23 describes an extended involute having a positive modification $p$ relative to the common involute 30 developed from the pitch circle 28. The exact value of the said modification is $$p = b \sin \gamma \quad (13)$$

and the equation of the curve 29 relative to the axes X Y is $$x = (a+p) \cos \phi + a\phi \sin \phi$$
$$y = (a+p) \sin \phi - a\phi \cos \phi \quad (14)$$

where the geometrical meaning of the parameter $\phi$ is as in Figure 5.

Let now R denote the radius of curvature of the curve 29 such as, for instance, the radius $O_2$ $O_5$, then $$R = \frac{(p^2 + a^2\phi^2)^{\frac{3}{2}}}{p^2 + a^2\phi^2 - ap} \quad (15)$$

The tooth curve 32 is an envelope of a family of circles of a radius $b$ all having their respective centers in the curve 29. Such being the case, the two curves are parallel to each other and possess the same evolute 31. From this relationship the radius of curvature $\rho$ of the pinion curve 32 is readily determined:

$$\rho = R - b \quad (16)$$

Figure 7:
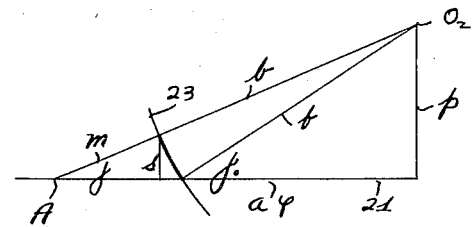
Figure 7 is a diagram used in connection with the equations 18 to 20.

In order to analyze the behaviour of the curve 32 at any point thereof, I transform the Equations 15 and 16 by means of the diagram Figure 7.

$$p^2 + a^2\phi^2 = (b+m)^2 \quad (17)$$

$$m = \frac{s}{\sin \gamma} \quad (18)$$

$$\sin \gamma = \frac{p-s}{b} \quad (19)$$

$$b + m = \frac{pb}{p-s} \quad (20)$$

where $s$ denotes the distance of the point in engagement from the pitch line of the rack.

The generation of the mating gear 34 by means of a G rack is shown in Figure 6. The path curve of the rack center $O_2$ is now an abridged involute 35 having exactly the opposite (a negative) modification $p$ to the former case and is derived from the common involute 36. The Equations 13 to 20 exactly apply to the curve 35 when $p$ is considered as a negative number. The tooth curve 37 possesses the evolute 38 in common with the abridged involute 35 but is now situated at the opposite side of the said evolute.

In designing the new gears I begin with analyzing the tooth curve 37, Figure 6, either graphically or by means of the Equations 13 to 20. In particular, there is a danger that the curve 37 will run into too small a radius near its root if the rack radius $b$ or the number of teeth in the gear is selected too small. On the other hand, there is no difficulty whatever with the rack P for which reason my system is at its best in pinion and rack drives and in worm and wheel drives. As to the rack G, to cite an example, for 6 Dia. Pitch, standard depth of tooth, for $b=3.5''$ the said rack will generate all gears from 27 teeth and up, 20° pressure angle. By raising the lower limit as to the number of teeth the radius $b$ may be reduced and a more intensive and effective modification obtained.

Figure 8:
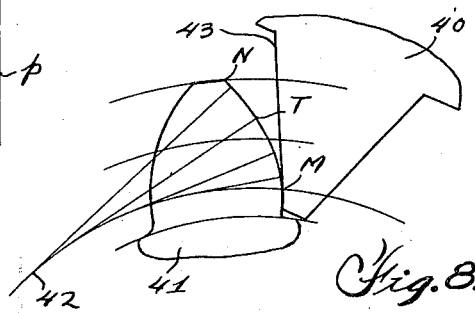
Figures 8 and 9 are diagrams explaining the principle upon which the areas of maximum stress are avoided in my construction.
Figure 9:
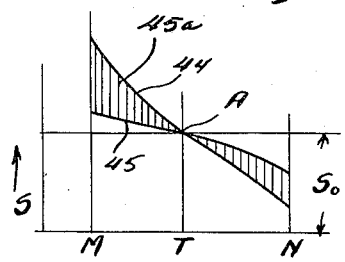

From the principle upon which the surface or Hertz stresses are calculated, it is known that a gear tooth is substantially a roller and its load bearing ability is proportional to its momentary radius of curvature. When two flanks are involved, both curved, then the measure of stress is the momentary relative radius of curvature. The stress will be infinite whenever the radius of curvature of either of the participating flanks is equal to zero. This is exactly the condition which my invention avoids. In Figure 8 a conventional involute tooth 41 is shown in mesh with its rack 40. The radii of curvature are developed from the base circle 42 and constantly increase from M to T to N, the value at M being substantially equal to zero. Inasmuch as the rack flank 43 is a straight line, the relative radii of curvature of the two members 40 and 41 are exactly equal to the pinion radii at M, T and N. In Figure 9 the ordinate indicates the stress S and the abscissa the developed arc M T N. As the contact travels from M towards N, the stress varies along the curve 44. In my improved rack and pinion drive, see Figure 5, the stresses are practically constant as represented by the curve 45. The mean stress $S_0$ at the pitch point A is the same in both of these and all other systems as was shown in the Equations 1 to 5. The gain consists in eliminating the area of maximum stress $45a$ at the left hand side of Figure 9.

Figure 10:
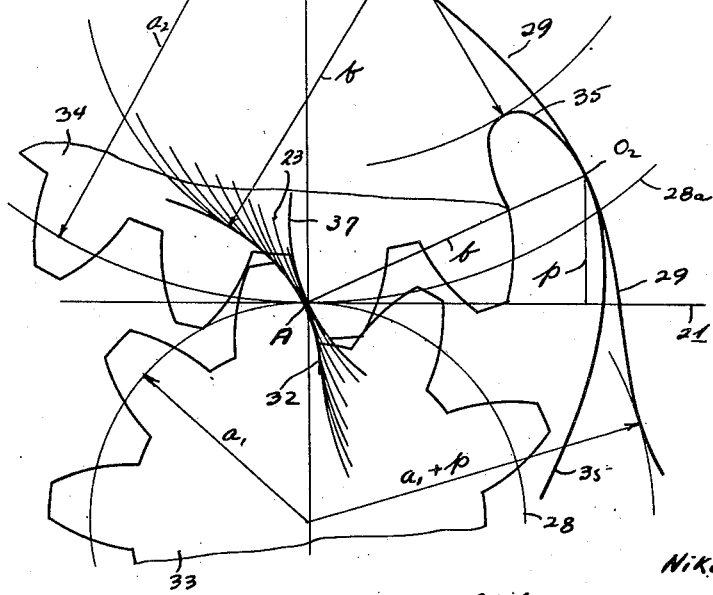
Figure 10 shows a pinion and gear of the new design in mesh.

I shall now briefly recapitulate this somewhat complicated development. As shown in Figure 10 the tooth curve 32 of the pinion 33 is generated from the extended involute 29 drawn from the modified base radius $a_1+p$ with a positive modification $p$. The process of generation of the curve 32 from the curve 29 consists in sealing off a constant distance $b$ along the normals of the latter, i. e., the two curves are equidistant from each other. Similarly the tooth curve 37 of the mating gear 34 is generated from the abridged involute 35 drawn from the modified base radius $a_2-p$ with a negative modification $p$. The process of generation of the curve 37 from the curve 35 consists in scaling off a constant distance $b$ along the normals of the latter, i. e., the two curves are equidistant from each other.

As was shown previously, this leads to the employment of two racks P and G, both having exactly the same line of action, a conchoidal spiral and the first having convex and the second concave faces or flanks. It will be seen that the gears thus generated will correctly mesh and with a uniform velocity because the line of action is exactly the same in either rack.

In manufacturing the new gears, hobs, fellows cutters and grinders may be employed. In Figure 11 the principle of hobbing helical gears of this type is illustrated. A right hand pinion 46 meshes with a left hand gear 47. Two hobs are used to generate this pair, the hob 48 of the P type (having convex faces) to generate the pinion 46 and the hob 49 of the G type to generate the gear. It is desirable but not absolutely necessary to make each hob of the same hand as the gear it is going to cut.

A worm drive constructed on this principle is shown in Figures 12 and 13. Now the worm 50 represents the rack P, Figure 5, and the worm wheel 51 the pinion. The worm teeth 52 are of a convex outline conforming to this theory. A concave contoured grinder 53 is used to grind the threads preferably by the oscillating method as shown in my co-pending application for patent, Serial No. 466,204, filed July 7, 1930. In a preferred construction I so select the radius of curvature $b$ of the worm thread contour that the radii of curvature at the pitch point will be exactly the same in the worm and wheel. This is readily accomplished by solving the Equation (6) for
$$\rho_1 = b.$$
The said equation then becomes $$\frac{2}{b} = \frac{1}{a_1 \sin \gamma_0} \qquad (21)$$
$$b = 2a_1 \sin \gamma_0 \qquad (22)$$

that is, the radius of the wheel tooth flank is now twice as great as in the common involute system.

Spiral bevel gears may also be improved upon this principle. In Figures 14 and 15 the face mill cutter 54 having a convex tooth flank 55 of a radius $b$ is used to generate the pinion, while the cutter 56 having a concave tooth flank 57 of a radius $b$ is used to generate the larger number or the gear, of the drive.

What I claim as my invention is:

1. In a mating pinion and gear, a pair of conjugate tooth curves so formed that the tooth curve of the smaller member is the envelope of a rack having convex tooth flanks when the pitch line of the said rack rolls over the pitch line of the said member and the tooth curve of the larger member is the envelope of another rack having concave tooth flanks, the second rack being an exact complement of the first rack and its curvature so determined that both generated cross contours remain convex.

2. In a pinion a tooth curve obtained by scaling off a constant distance along the normals of an extended involute.

3. In a gear a tooth curve obtained by scaling off a constant distance along the normals of an abridged involute.

4. A pair of mating tooth curves in which the first curve is a parallel curve to an extended involute generated from its pitch circle with a positive modification, and the second curve is a parallel curve to an abridged involute generated from the second pitch circle with a negative modification and in which the modifications and the distances of the tooth curves from their respective base curves are respectively equal in absolute value.

5. A cooperating rack and pinion in which the flanks of the rack teeth are convex at all points thereof and the pinion flanks possess increased radii of curvature as compared with the corresponding common involute radii at all points thereof.

6. A pinion having an increased duration of contact permitting the employment of fewer teeth than in standard construction in which the said increase is obtained by generating the teeth by means of a rack tooth in which the pressure angle ever increases from the roots toward the tips thereof in combination with a mating wheel in which the pressure angle of the generating rack tooth ever decreases from the roots to tips thereof.

7. In a worm and wheel drive, a worm having a helical thread and convex thread contour as measured in its axial plane in which the radius of curvature of the said contours is substantially twice as long as the corresponding involute radius in the wheel tooth.

8. A spiral bevel pinion and gear in which the pinion teeth are such as might be generated from a spiral crown wheel having convex tooth cross contours and the teeth of the larger member from a similar crown wheel having concave tooth cross contours, the correction being such that both generated cross contours remain convex.

NIKOLA TRBOJEVICH.